Nov. 8, 1927.
E. H. WRIGHT
1,648,710
COMBINED TRIP AND THROTTLE VALVE
Filed May 26, 1924
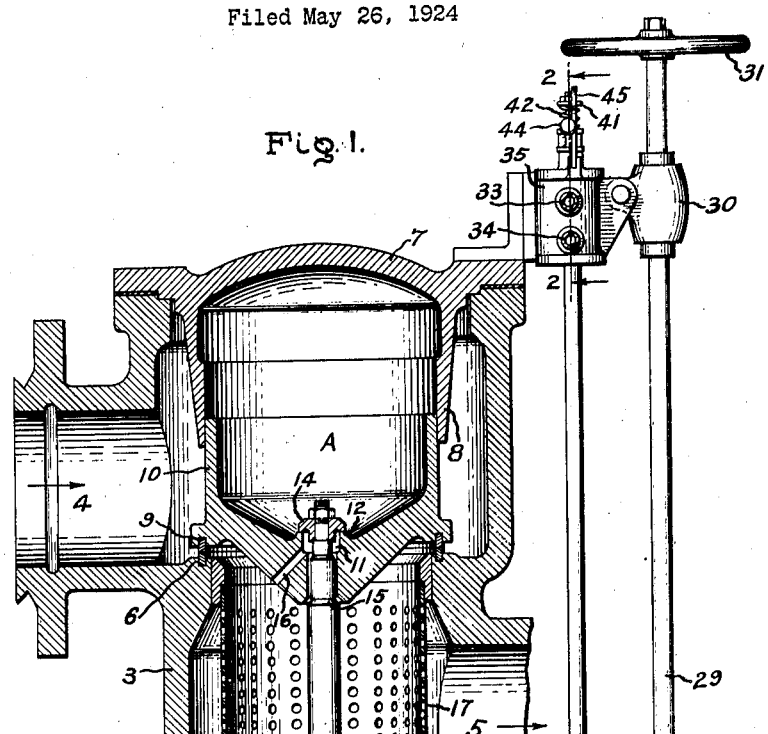
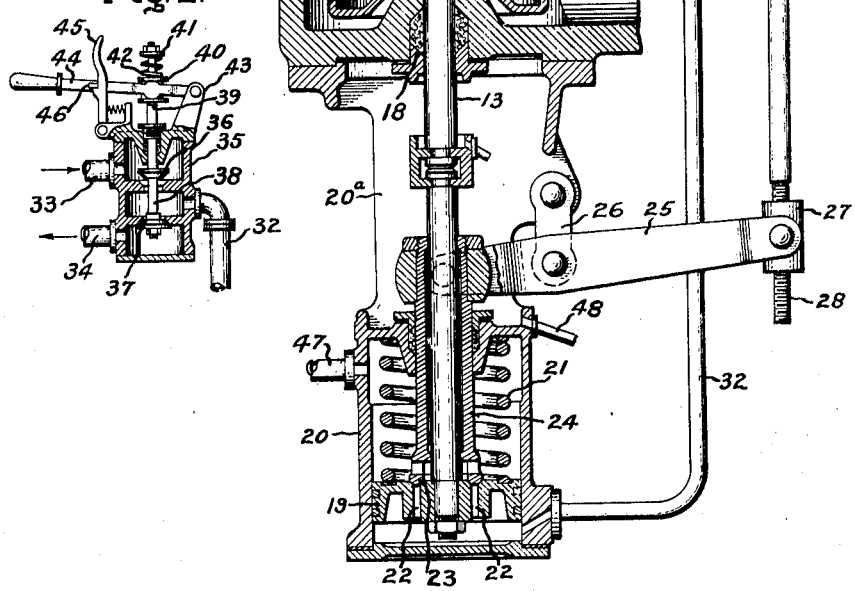
Inventor
Edward H. Wright
by *His Attorney*

Patented Nov. 8, 1927.

1,648,710

UNITED STATES PATENT OFFICE.

EDWARD H. WRIGHT, OF SCHENECTADY, NEW YORK, ASSIGNOR TO GENERAL ELECTRIC COMPANY, A CORPORATION OF NEW YORK.

COMBINED TRIP AND THROTTLE VALVE.

Application filed May 26, 1924. Serial No. 716,010.

The present invention relates to combined trip and throttle valves such as are used in connection with elastic fluid turbines for example, for controlling the supply of elastic fluid to the turbine, valves of this type arranged to be operated by hand to throttle the flow of the elastic fluid or to be tripped automatically to effect quick closing of the valve being well known and in common use for performing these functions.

The object of the present invention is to provide an improved combined trip and throttle valve which is simple in structure and reliable in operation, and which can be manufactured at a low cost, and for a consideration of what I believe to be novel and my invention attention is directed to the accompanying description and the claims appended thereto.

In the drawing, Fig. 1 is a vertical sectional view of a valve structure embodying my invention; and Fig. 2 is a sectional view taken on lines 2—2, Fig. 1.

Referring to the drawing, 3 indicates a valve casing provided with an inlet conduit 4, a discharge conduit 5, and a seat 6. The upper end of the valve casing is closed by a cover 7, which carries a depending cylinder 8 projecting into casing 3. In the casing 3 is a main valve A comprising a valve portion 9, which is adapted to engage seat 6 and a piston portion 10 which slides in cylinder 8. In valve portion 9 is a passage 11 provided with a valve seat 12 at its upper end. The valve stem is indicated at 13. Its upper end extends through passage 11 and is provided with pilot valve 14, which cooperates with valve seats 12 and with a shoulder 15 adapted to engage the bottom of the main valve A to open it when the stem is moved upward. Passage 11 just beneath seat 12 is connected to the discharge side of valve A by an opening 16. In casing 3 on the discharge side of valve A is a suitable strainer 17.

Valve stem 13 extends through a suitable stuffing box 18 in casing 3, and at its lower or outer end is connected to a piston 19 located in a cylinder 20. Cylinder 20 is attached to valve casing 3 by side plates 20ª. In cylinder 20 above piston 19 is a spring 21 which tends to bias piston 19 to a position at the bottom of cylinder 20 in which position valve A is closed. In other words, spring 21 functions as a means to bias valve A to closed position. In piston 19 are a plurality of ports 22 controlled by a valve 23 carried on the lower end of a sleeve 24. Sleeve 24 projects out through the top of cylinder 20 and is connected to one end of a lever 25 suitably pivoted on a link 26. The other end of lever 25 is pivotally connected to a nut or sleeve 27, which screws on to the threaded end 28 of an operating rod 29. Rod 29 is journaled in an upper bearing 30 and is provided with an operating handle 31. By turning handle 31 it will be clear that nut or sleeve 27 can be raised and lowered to turn lever 25 on pilot link 26.

Connected to cylinder 20 beneath piston 19 is a pressure pipe 32 and this in turn is arranged to be connected either to a supply of fluid pressure indicated by pipe 33 or to a region of lower pressure indicated by pipe 34 by a valve mechanism which in the present instance is shown as comprising a casing 35 in which are two valves 36 and 37 connected to a common valve stem 38. Valve 36 controls the connection of pipe 32 to pipe 33 and valve 37 controls the connection of pipe 32 to pipe 34. On the upper portion of stem 38 is a shoulder 39 against which rests a spool 40 and between spool 40 and a washer 41 on the end of the stem is arranged a spring 42. Pivoted on an ear 43 on casing 35 is a hand lever 44 which at an intermediate point is connected to spool 40. At 45 is a latch which engages a lug 46 on hand lever 44 to hold it in a position wherein valve 36 is open and valve 37 closed. Valve 37 is held yieldingly on its seat by spring 42, the spring serving to take up any wear and to insure seating of the valve. The movable parts of this valve structure are biased by the weight of the parts to a position wherein valve 35 is closed and valve 37 is open, and when latch 45 is moved to release handle 44 valves 36 and 37 will move immediately to close valve 36 and open valve 37.

Connected to cylinder 20 above piston 19 is a discharge conduit 47 which may lead to any suitable point. Also connected to the top of the cylinder 20 is a pipe 48 for carrying away any fluid leaking out of cylinder 20 around sleeve 24.

In the drawing, the main valve A is shown as being closed and it is held closed by spring 21 and also by the pressure in cylinder 8 acting on the upper surface of the valve, it being understood that piston flange 10 fits cylinder 8 loosely enough to permit the pressure which exists in inlet conduit 4 to find its way into cylinder 8. The quick release control mechanism is shown in Fig. 2 as being set so that fluid pressure from supply conduit 33 may flow through conduit 32 to cylinder 20 so that the under side of piston 19 is subjected to fluid pressure which is acting in a direction to open the valve. However, piston 19 is held from movement by sleeve 24, which in turn is held stationary by the hand controlled operating mechanism including lever 25, rod 29, and hand wheel 31.

If now it is desired to open the valve, hand wheel 31 is turned in a direction to lower nut 27 on rod 29 thereby raising sleeve 24 to move it away from piston 19, permitting the pressure under the piston to lift the piston. When piston 19 moves upward it first lifts pilot valve 14 to relieve the pressure in cylinder 8 after which shoulder 15 engages the valve to lift it from its seat. It will be understood that pilot valve 14 operates in the usual and well known manner to permit of the escape of pressure from cylinder 8 faster than pressure can enter it through the admission passage which in the present instance is provided by the clearance between piston flange 10 and cylinder 8. Piston 19 will follow directly upward movement of sleeve 24 so that by moving sleeve 24 upward, the valve A can be opened to any desired extent. To close valve A, handwheel 31 is turned in the other direction so as to raise nut 27, thereby lowering sleeve 24 and forcing the valve closed, piston 19 moving against the fluid pressure in cylinder 20. Thus it will be seen that valve A can be opened and closed or set in any intermediate position by simply turning hand wheel 31.

At any time when the valve is open it can be tripped and quickly closed independently of hand wheel 31 by moving catch 45 to release lever 44 so as to permit valve 36 to close and valve 37 to open. This disconnects conduit 32 from the fluid pressure supply source and connects it to discharge conduit 34, thereby relieving the pressure under piston 19 and permitting spring 21 to quickly close valve A. As soon as piston 19 moves away from the lower end of sleeve 24, ports 22 are opened permitting fluid pressure from beneath piston 19 to escape through such ports and out through discharge conduit 47. This serves to effect more quickly the discharge of the fluid pressure from beneath piston 19. Catch 45 may be tripped by hand or it may be tripped automatically in response to an operating condition of the machine with which the valve is used as is well understood.

To open the valve again after it has been tripped and closed, it is necessary first to turn hand wheel 31 to closed position in which position sleeve 24 closes ports 22. Either prior to or subsequent to this operation, the positions of valves 35 and 37 are reversed by raising hand lever 44, bringing it back to the Fig. 2 position where it is held up by catch 45. This again connects conduit 32 to the fluid pressure supply but it will be seen that no pressure will be built up under piston 19 to open valve A until ports 22 are closed. After sleeve 24 has been lowered to close ports 22, then valve A can be manipulated again by means of hand wheel 31, as already explained. Because of this arrangement there is no danger of valve A being quickly opened wide after being tripped by putting the oil pressure back on to cylinder 20.

Any suitable source of fluid pressure may be used for operating the valve. In the case of an elastic fluid turbine, for example, I may use fluid pressure from the lubricating system for the turbine.

My improved valve mechanism is easy to operate manually by means of hand wheel 31 and when in any open position can be quickly closed automatically and entirely independently of handwheel 31 by disconnecting the fluid pressure supply from cylinder 20. At the same time it is simple in structure and can be manufactured at a low cost.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:—

1. In a valve structure, the combination of a valve casing, a valve therein, a stem connected to the valve and extending out through the casing, a cylinder, a piston in the cylinder to which the outer end of said stem is connected, said piston being provided with a port, a sleeve which surrounds the stem and engages the piston to close said port, means for moving the said sleeve on the the stem, and means for admitting actuating fluid to the cylinder beneath said piston.

2. In a valve structure, the combination of a valve casing, a valve therein, a stem connected to the valve and extending out through the casing, a cylinder, a piston in the cylinder to which the outer end of said stem is connected, said piston being provided with a port, a sleeve which surrounds the stem and engages the piston to close said port, means for moving the said sleeve on the stem, said means comprising a lever pivotally connected with the sleeve exteriorly of the cylinder and an operating hand wheel connected with the lever to move the same, and means for admitting actuating fluid to the cylinder beneath said piston, said means comprising a conduit connected with the cylinder and a trip relief valve in said conduit, said valve being located adjacent the hand wheel.

In witness whereof, I have hereunto set my hand this 24th day of May, 1924.

EDWARD H. WRIGHT.